United States Patent
Nagao

(10) Patent No.: US 9,811,071 B2
(45) Date of Patent: Nov. 7, 2017

(54) SYSTEM CONSTRUCTION SUPPORT APPARATUS

(71) Applicant: Kayo Nagao, Tokyo (JP)

(72) Inventor: Kayo Nagao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 241 days.

(21) Appl. No.: 14/435,673

(22) PCT Filed: Nov. 22, 2012

(86) PCT No.: PCT/JP2012/080300
§ 371 (c)(1),
(2) Date: Apr. 14, 2015

(87) PCT Pub. No.: WO2014/080489
PCT Pub. Date: May 30, 2014

(65) Prior Publication Data
US 2015/0277413 A1    Oct. 1, 2015

(51) Int. Cl.
G06F 15/173    (2006.01)
G05B 19/05    (2006.01)

(52) U.S. Cl.
CPC ........... *G05B 19/05* (2013.01); *G05B 19/056* (2013.01)

(58) Field of Classification Search
CPC ..... G06B 19/05; G06B 19/056; G06B 15/056
See application file for complete search history.

(56) References Cited

U.S. PATENT DOCUMENTS 5,150,464 A * 9/1992 Sidhu ................ H04L 29/06
                                            709/222
6,643,658 B1 * 11/2003 Jai ................... G06F 17/30887
(Continued)

FOREIGN PATENT DOCUMENTS

DE    10210280 A1    10/2002
JP    06-203089 A     7/1994
(Continued)

OTHER PUBLICATIONS

Communication dated Jul. 11, 2016, issued by the Korean Intellectual Property Office in corresponding Korean Application No. 10-2015-7013560.
(Continued)

*Primary Examiner* — Brian Whipple
(74) *Attorney, Agent, or Firm* — Sughrue Mion, PLLC; Richard C. Turner

(57) ABSTRACT

A system construction support apparatus 1 includes a non-volatile memory 4 that stores in advance apparatus information (projects and design information) that is written such that device numbers and character strings associated with the device numbers are included; a name-candidate-list generating unit that extracts character strings included in the apparatus information in association with device numbers associated with the character strings, organizes the extracted character strings into an entry for each device on the basis of a device number corresponding to each of the character strings, and displays a list of character strings; and a label registering unit that receives an input selecting one of the character strings displayed in the list for each entry and registers the selected character string as a label of a device corresponding to the character string.

5 Claims, 6 Drawing Sheets

(56) References Cited

U.S. PATENT DOCUMENTS

| | | | |
|---|---|---|---|
| 7,117,040 B2 | 10/2006 | Masuda et al. | |
| 2004/0139270 A1 | 7/2004 | Masuda et al. | |
| 2005/0102368 A1* | 5/2005 | Forman .................. | H04L 51/28 709/207 |
| 2005/0157543 A1 | 7/2005 | Masuda et al. | |
| 2006/0155889 A1 | 7/2006 | Furushima et al. | |
| 2013/0325153 A1 | 12/2013 | Kobayashi et al. | |

FOREIGN PATENT DOCUMENTS

| | | | |
|---|---|---|---|
| JP | 07-049651 | A | 2/1995 |
| JP | 09-282015 | A | 10/1997 |
| JP | 10083206 | A | 3/1998 |
| JP | 2001-255908 | A | 9/2001 |
| JP | 2002163010 | A | 6/2002 |
| JP | 2005-251014 | A | 9/2005 |
| JP | 2007-265252 | A | 10/2007 |
| JP | 4994517 | B1 | 8/2012 |

OTHER PUBLICATIONS

International Search Report for PCT/JP2012/080300 dated Feb. 5, 2013.

Decision of a Patent Grant for corresponding JP 2014-548387 dated Feb. 24, 2015.

Communication dated Jan. 13, 2016 from the German Patent and Trademark Office in counterpart application No. 112012007014.3.

* cited by examiner

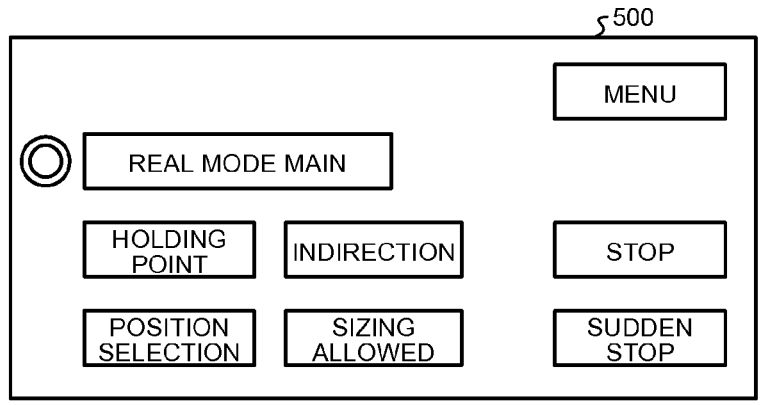

| OBJECT NAME | DEVICE | NAMEPLATE |
|---|---|---|
| SWITCH | (1)-M6465 | REAL MODE MAIN |
| SWITCH | (1)-M6410 | HOLDING POINT |
| SWITCH | (1)-M6411 | POSITION SELECTION |
| SWITCH | (1)-M6412 | INDIRECTION |
| SWITCH | (1)-M6414 | SIZING ALLOWED |
| ... | | |

FIG.7-3

| OBJECT NAME | DEVICE | NAMEPLATE |
|---|---|---|
| SWITCH | REAL MODE | REAL MODE MAIN |
| SWITCH | HOLDING POINT A | HOLDING POINT |
| SWITCH | POSITION SELECTION | POSITION SELECTION |
| SWITCH | INDIRECTION | INDIRECTION |
| SWITCH | SIZING ALLOWED | SIZING ALLOWED |
| ... | | | though, such as spec to the con-
SYSTEM CONSTRUCTION SUPPORT APPARATUS

CROSS REFERENCE TO RELATED APPLICATIONS

This application is a National Stage of International Application No. PCT/JP2012/080300 filed Nov. 22, 2012, the contents of all of which are incorporated herein by reference in their entirety.

FIELD

The present invention relates to a system construction support apparatus that supports the construction of a system.

BACKGROUND

Some systems are configured to use a programmable controller (PLC). When such a system is constructed, the user can use a system construction support apparatus. With the system construction support apparatus, the user can generate a system configuration diagram illustrating the connection relationships between apparatuses by arranging displayed objects corresponding to the apparatuses (PLC, display, and apparatuses controlled by PLC) from which the system is configured at desired positions on the screen and connecting the displayed objects with each other. The user can generate the system configuration diagram simulating the system to be constructed in the system construction support apparatus and can examine, in advance, the apparatuses to be selected and the setting information on the apparatuses.

The setting information set in the PLC includes a control program of the PLC. It is conventional for the user to create a control program in which the real addresses, which are referred to as devices, are directly specified by device numbers. Meanwhile, it has recently become possible to modularize a control program by creating the control program using variables referred to as labels and assigning devices to the labels (see, for example, Patent Literature 1).

CITATION LIST

Patent Literature

Patent Literature 1: Japanese Patent Application Laid-open No. H09-282015

SUMMARY

Technical Problem

However, in order to make labels available for a system constructed using device numbers, it has been necessary to perform, for each device, a registration operation of registering a label with a device and an operation of replacing the device number in the setting information for each apparatus with the label. When labels are registered, the user searches for a character string associated with a device from a unique specification or a project including device numbers. If it appears possible to use the found character string as a label, the user registers the character string as a label. When device numbers are replaced by labels, the user replaces the device numbers with already registered labels one by one. When label registration and label replacement are manually performed in such a manner, input omission or input error sometimes occurs during the operations. Moreover, the number of man-hours for label registration and label replacement increases as the size of the system increases, thereby increasing the workload on the user.

The present invention has been achieved in view of the above and an object of the present invention is to obtain a system construction support apparatus capable of promptly and easily registering labels.

Solution to Problem

In order to solve the above problems and achieve the object, the present invention relates to a system construction support apparatus that supports generation of a system configuration diagram that simulates a system configured from apparatuses, including: a storing unit that stores apparatus information that is written such that a device number and a character string associated with the device number are included and that is set in an apparatus or is associated with the apparatus; a list display unit that extracts character strings included in the apparatus information in association with device numbers that are associated with the character strings, organizes extracted character strings into an entry for each device on a basis of a device number corresponding to each of the character strings, and displays a list of the character strings; and a label registering unit that receives an input selecting one of character strings displayed in the list for each entry and registers selected character string as a label of a device corresponding to the character string.

Advantageous Effects of Invention

According to the system construction support apparatus of the present invention, it is possible to save labor of a user required for searching for device numbers one by one from the setting information; therefore, the user can easily perform an operation of registering labels.

BRIEF DESCRIPTION OF DRAWINGS

FIG. 6-1 is a diagram explaining an example of the control program written using device numbers.

FIG. 6-2 is a diagram explaining an example of the control program after device numbers are converted into label names.

FIG. 7-1 is a diagram explaining an example of a display screen of a programmable display.

FIG. 7-2 is a diagram explaining an example of screen data written using device numbers.

FIG. 7-3 is a diagram explaining an example of screen data after device numbers are converted into label names.

DESCRIPTION OF EMBODIMENTS

Exemplary embodiments of a system construction support apparatus according to the present invention will be explained below in detail with reference to the drawings. This invention is not limited to the embodiments.

Embodiment

Figure 1:
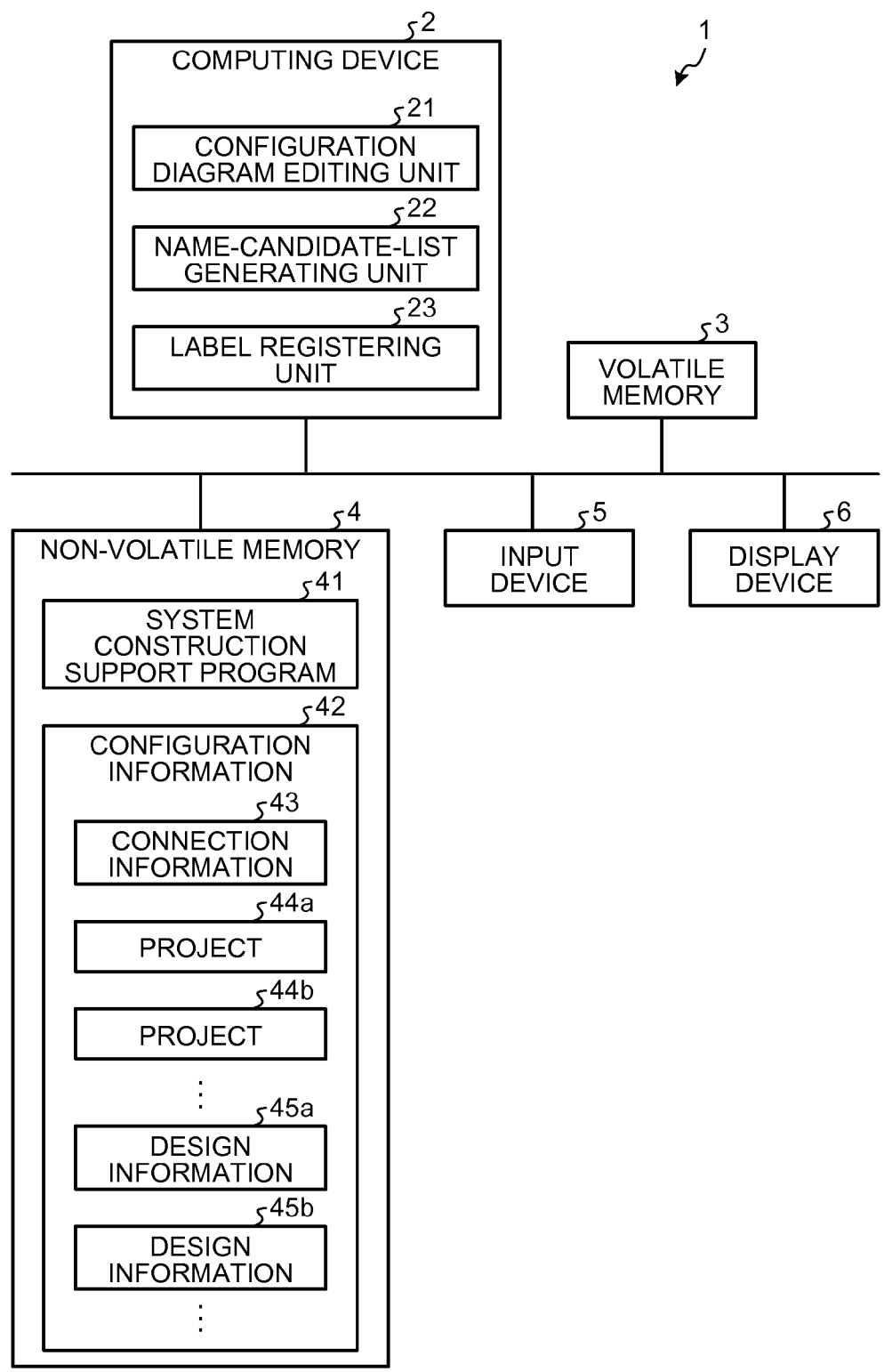
FIG. 1 is a diagram explaining an example of the configuration of a system construction support apparatus according to an embodiment.

FIG. 1 is a diagram explaining an example of the configuration of a system construction support apparatus according to an embodiment of the present invention. A system construction support apparatus 1 includes a computing device 2, a volatile memory 3, a non-volatile memory 4, an input device 5, and a display device 6. The computing device 2, the volatile memory 3, the non-volatile memory 4, the input device 5, and the display device 6 are connected to each other via a bus.

The input device 5 receives an operation input for the system construction support apparatus 1 from the user and sends the received operation input to the computing device 2. The input device 5 is configured from, for example, a mouse and a keyboard.

The display device 6 includes a display screen configured from, for example, a liquid crystal display (LCD). The display device 6 displays an image frame generated by the computing device 2 on the display screen.

The computing device 2 is configured from, for example, a central processing unit (CPU). The volatile memory 3 is configured from, for example, a random access memory (RAM). The non-volatile memory 4 is configured from, for example, a read only memory (ROM), a hard disk drive (HDD), a solid state drive (SSD), or a combination thereof.

The volatile memory 3 has a program load area and a work area. The non-volatile memory (storing unit) 4 stores in advance a system construction support program 41. The computing device 2 loads the system construction support program 41 stored in the non-volatile memory 4 in the program load area of the volatile memory 3 in accordance with an activation input that is input from the input device 5. The computing device 2 then executes the system construction support program 41 loaded in the program load area, thereby functioning as a configuration diagram editing unit 21, a name-candidate-list generating unit (list display unit) 22, and a label registering unit 23.

While the configuration diagram editing unit 21 is receiving an input for editing the configuration diagram (system configuration diagram) of a system from the input device 5, the configuration diagram editing unit 21 sequentially reflects the input editing content in the system configuration diagram that is being edited.

Figure 2:
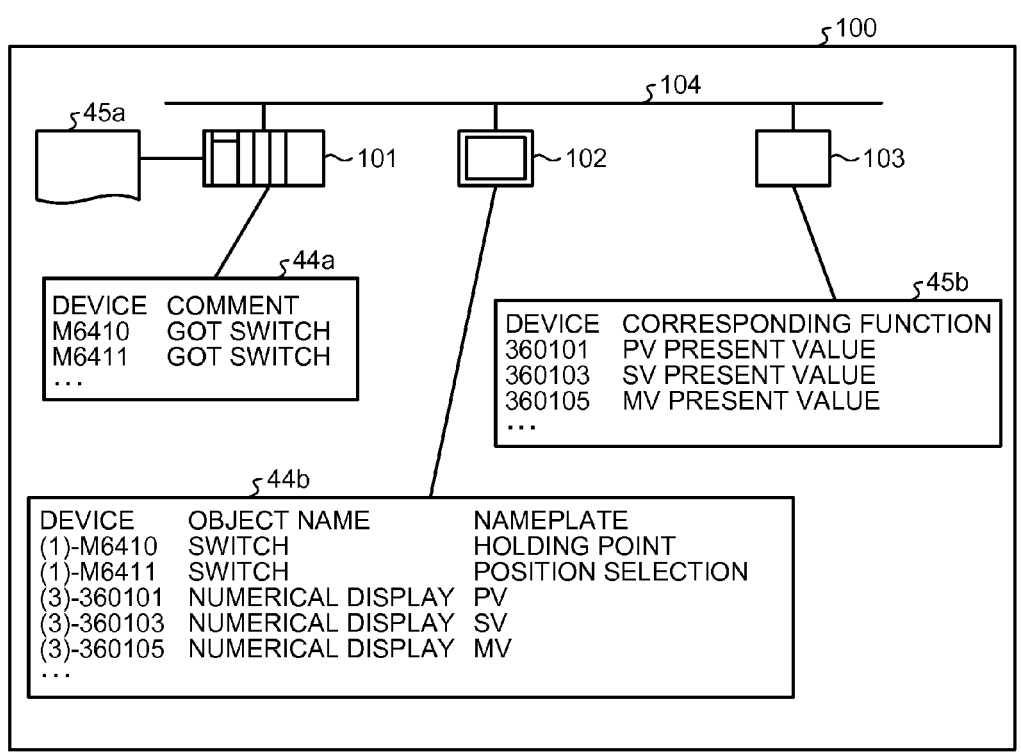
FIG. 2 is a diagram explaining an example of a system configuration diagram.

FIG. 2 is a diagram explaining an example of the system configuration diagram generated by operating the configuration diagram editing unit 21. In the example in FIG. 2, in a system configuration diagram 100, a PLC 101 and a display 102 are arranged such that they are connected by a connection line 104. The connection line 104 is information describing the connection relationships between apparatuses from which the system is configured. The PLC 101 and the display 102 each have setting information for operating the apparatus, which is referred to as a project (project 44a or 44b) generated by a unique tool included in the system construction support apparatus 1.

In the project 44a set in the PLC 101, each device number used in the project 44a is recorded in association with a comment. The project 44a is configured to include a control program written using device numbers. The project 44a illustrated in FIG. 2 selectively illustrates some elements of the control program. In the project 44a illustrated in FIG. 2, for example, the device number "M6410" is associated with the comment "GOT switch".

In the project 44b set in the display 102, each device number used in the project 44b is recorded in association with the nameplate name or the function name displayed on the display screen of the display 102 and the name of a displayed object (hereinafter, simply "object") displayed on the display screen of the display 102. The display screen of the display 102 is formed based on the screen data included in the project 44b. In the screen data, the object name, the arrangement position on the display screen, the device number, and the nameplate (or the function name) are written in association with each other. An object indicates a part to be displayed on the display screen and various types of objects are prepared in advance so as to be able to adapt to various display forms. For example, the types of objects include a switch, a button, numerical display, and graphical display, and a name is assigned to each type. For example, the name "switch" is assigned to an object simulating the shape of a switch. The project 44b illustrated in FIG. 2 selectively illustrates some elements of the screen data set in the display 102. In the project 44b illustrated in FIG. 2, for example, the device number "(1)-M6410" is associated with the object name "switch" and the nameplate "holding point".

In the system configuration diagram 100, a general-purpose apparatus 103, which does not have a configuration tool unique to the system construction support apparatus 1, is arranged on the system configuration diagram 100. The general-purpose apparatus 103 is connected to the PLC 101 and the display 102 by the connection line 104. The general-purpose apparatus 103 is sometimes associated with design information 45b, which is obtained by collecting information necessary for generating a project. The design information 45b may be generated by a tool different from the system construction support apparatus 1. In the design information 45b in FIG. 2, each device number used in the general-purpose apparatus 103 is associated with information (corresponding function) on the function of a destination to which the device number is assigned. The design information (design information 45a) may be set for the PLC 101 in some cases.

The configuration diagram editing unit 21 records the system configuration diagram 100 in the non-volatile memory 4 as configuration information 42 at the time desired by the user. The configuration information 42 includes connection information 43 describing the connection relationships between the apparatuses with which the system is configured, the projects (the project 44a, the project 44b, etc.), and the design information (the design information 45a, the design information 45b, etc.). The connection information 43 is graphically displayed such that it corresponds to the connection line 104.

Hereinafter, in some cases, the projects 44a and 44b are collectively described as projects 44 and the design information 45a and 45b are collectively described as design information 45. The projects 44 and the design information 45 correspond to apparatus information written in Solution to Problem of the present invention.

The name-candidate-list generating unit 22 extracts, from the projects 44 and the design information 45 included in the configuration information 42, character strings associated with device numbers for each device. The name-candidate-list generating unit 22 then displays, on the display device 6, a name-candidate-list display (a name-candidate-list display 110), in which the extracted character strings are listed for each device. In other words, the name-candidate-list generating unit 22 organizes the extracted character strings into entries, where each entry is for one device, on the basis of a device number corresponding to an individual character string and displays a list of character strings.

The character string to be extracted by the name-candidate-list generating unit 22 may be any character string as long as the character string is associated with a device. In this example, the comments associated with the devices in the project 44a, the object names, nameplates, and function names associated with the devices in the project 44b, and the corresponding functions associated with the devices in the design information 45b are extracted as candidates for label names. Names of data (control program and image data) including devices, names of screens on which corresponding objects are arranged, names of projects, names of design information, and the like may be targeted for extraction. Hereinafter, comments, object names, nameplates, function names, corresponding functions, names of screens, names of projects, and names of design information are referred to as types of character strings. The user can arbitrarily set the type of character string to be extracted.

When a plurality of character strings are extracted for one device, the name-candidate-list generating unit 22 arranges the extracted character strings according to the predetermined priority order and displays them. The user can arbitrarily set, for each type of character string, the priority order for displaying character strings.

The label registering unit 23 can receive, for each entry, an input selecting one of the character strings displayed on the name-candidate-list display 110. When the user selects one character string for one entry, the label registering unit 23 registers the selected character string as a label name of the device associated with the character string. The method of inputting a character string is not limited to the above method. For example, the label registering unit 23 can receive an input for generating one character string by combining a plurality of label name candidates or an input of a new character string that is not displayed as a label name candidate.

When label names are registered, the label registering unit 23 can check whether the same label name is not redundantly registered with a plurality of different devices and check whether the label name that is to be registered does not include a forbidden character. The label registering unit 23 can replace the device numbers written in the projects 44 with the registered label names.

The label registering unit 23 can perform the replacement, for example, by searching the project 44 for a device number that is a search key and replacing the device number that is found with a label. The name-candidate-list generating unit 22 may record in advance information specifying the extraction source and the label registering unit 23 may specify the position at which the device number to be replaced is written on the basis of the information on the extraction source.

Registration of a label name here indicates that a device and a label name are recorded in association with each other in label name information (label name information 46). The label name information 46 is stored, for example, in the non-volatile memory 4. After devices are replaced by label names, the control program included in the project 44a is compiled so as to be converted into an executable code and is downloaded to the PLC 101 together with the label name information 46. When the PLC 101 executes the executable code, the PLC 101 can specify devices corresponding to the label names included in the executable code by referring to the label name information 46. The control program included in the project 44a may be compiled together with the label name information 46 and converted into an executable code in which device numbers are used.

After devices are replaced by label names, the screen data included in the project 44b is downloaded to the display 102 together with the label name information 46. When the display 102 generates a display screen on the basis of the screen data, the display 102 can specify devices corresponding to the label names included in the screen data by referring to the label name information 46. The screen data included in the project 44b may be such that label names are converted into device numbers on the basis of the label name information 46 before being downloaded to the display 102.

Figure 3:
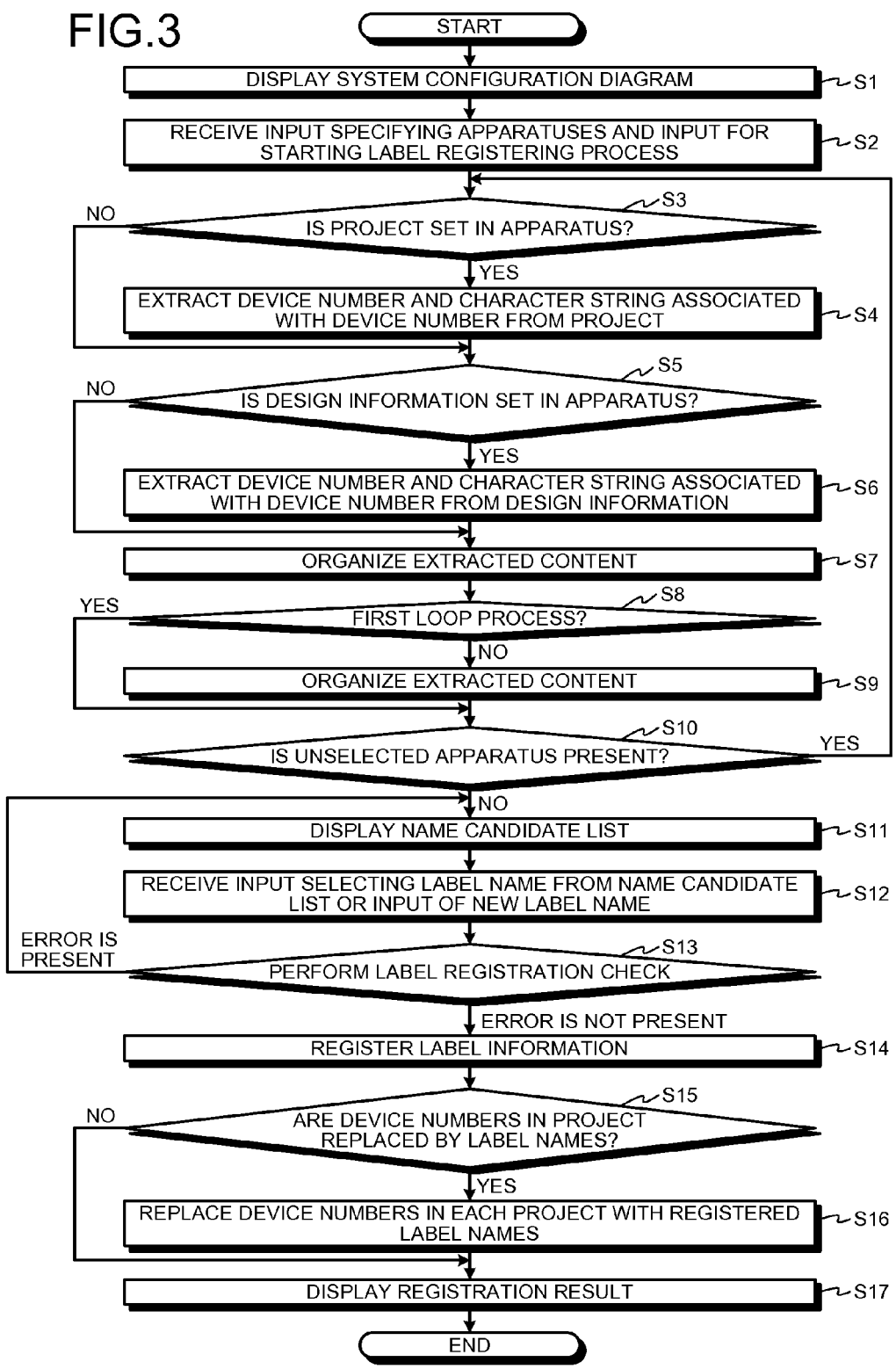
FIG. 3 is a flowchart explaining the operation of the system construction support apparatus according to the embodiment.

FIG. 3 is a flowchart explaining the operation of the system construction support apparatus 1 according to the embodiment of the present invention. In this example, the system construction support apparatus 1 completes editing the system configuration diagram 100 and the configuration information 42 corresponding to the system configuration diagram 100 is stored in the non-volatile memory 4.

The configuration diagram editing unit 21 first displays the system configuration diagram 100 on the display screen of the display device 6 (Step S1). By operating the input device 5, the user can specify apparatuses whose devices are to be changed to label names from the apparatuses (the PLC 101, the display 102, and the general-purpose apparatus 103) displayed on the system configuration diagram 100 and can input an instruction to start a process (label registering process) of registering label names.

When an input for specifying apparatuses and an input for starting the label registering process are received (Step S2), the name-candidate-list generating unit 22 performs a loop process from Step S3 to Step S10 to extract character strings from the projects 44 and the design information 45. Specifically, the name-candidate-list generating unit 22 selects one of the specified apparatuses and determines whether the project 44 is set in the selected apparatus (Step S3). When the project 44 is set in the selected apparatus (Yes at Step S3), the name-candidate-list generating unit 22 extracts, for each device number, a device number and a character string associated with the device number from the project 44 that is set in the selected apparatus (Step S4). The character strings extracted by the process at Step S4 are each paired with a device number and are stored in the work area in the volatile memory 3.

When the project 44 is not set in the selected apparatus (No at Step S3), the name-candidate-list generating unit 22 skips the process at Step S4.

Next, the name-candidate-list generating unit 22 determines whether the design information 45 is set in the selected apparatus (Step S5). When the design information 45 is set in the selected apparatus (Yes at Step S5), the name-candidate-list generating unit 22 extracts, for each device number, a device number and a character string associated with the device number from the design information 45 that is set in the selected apparatus (Step S6). When the process at Step S6 is performed, as described above, the name-candidate-list generating unit 22 records the types of extracted character strings The character strings extracted by the process at Step S6 are each paired with a device number and are stored in the work area in the volatile memory 3. When the design information 45 is not set in the selected apparatus (No at Step S5), the name-candidate-list generating unit 22 skips the process at Step S6.

Next, the name-candidate-list generating unit 22 organizes the content extracted from the selected apparatus (Step S7). Specifically, when the number of extracted corresponding relationships between a device number and a character string is two or more for the same device, the name-candidate-list generating unit 22 merges these corresponding relationships into an entry related to one device. With the process at Step S7, one or more name candidates for one device are organized into one entry and stored. The information describing the type of character string recorded for each corresponding relationship between a device number and a character string is stored in association with an individual character string.

Next, the name-candidate-list generating unit 22 determines whether the first loop process (Step S3 to Step S10) after the process at Step S2 is being executed (Step S8). When the first loop process is not being executed (No at Step S8), the name-candidate-list generating unit 22 organizes the content that is extracted from an apparatus different from the currently selected apparatus by the previously executed loop process and is stored in the volatile memory 3 and the content that is organized by the process at Step S7 in the loop process currently being executed and is stored in the volatile memory 3 (Step S9). Specifically, if it is apparent that a plurality of entry numbers extracted from different apparatuses are of entries related to the same device, the name-candidate-list generating unit 22 merges the entries related to the same device into one entry. The name-candidate-list generating unit 22 can determine whether a plurality of device numbers indicate the same device on the basis of the comparison between the device numbers and on the basis of the connection information 43.

According to the example illustrated in FIG. 2, for the "M6410" referred to by the PLC 101 and for the "(1)-M6410" referred to by the display 102, the alphabetic character "M" expressing the device type and the subsequent number string "6410" are completely the same. Moreover, according to the connection information 43 (the connection line 104), because the PLC 101 and the display 102 are connected to each other, the same device number indicates the same device. Accordingly, it is apparent that the device number "M6410" written in the project 44*a* and the device number "(1)-M6410" written in the project 44*b* indicate the same device. In such a case, the comment "GOT switch" associated with "M6410" in the project 44*a* and the object name "switch" and the nameplate "holding point" associated with "(1)-M6410" in the project 44*b* are stored in the work area as one entry. After being organized, "GOT switch", "switch", and "holding point" may be stored in association with the device number "M6410" or may be stored in association with the device number "(1)-M6410".

When one entry includes a plurality of character strings, the name-candidate-list generating unit 22 arranges the character strings included in one entry in descending order of priority on the basis of the information describing the types of character strings associated with the character strings and the priority order that is preset for each type.

When the loop process that is currently being executed is the first loop process (Yes at Step S8), the name-candidate-list generating unit 22 skips the process at Step S9.

Next, the name-candidate-list generating unit 22 determines whether an unselected apparatus is present among the specified apparatuses (Step S10). When an unselected apparatus is present (Yes at Step S10), the name-candidate-list generating unit 22 performs the process at Step S3 again. When an unselected apparatus is not present (No at Step S10), the name-candidate-list generating unit 22 shapes the list of entries stored in the work area into an image frame and displays it on the display screen as the name-candidate-list display 110 (Step S11).

Figure 4:
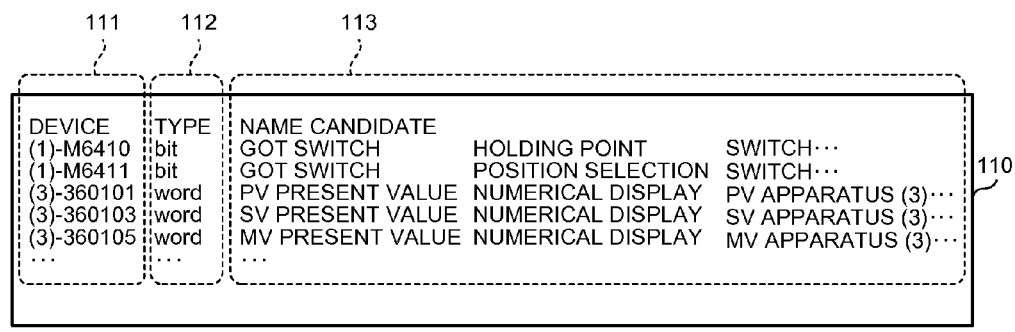
FIG. 4 is a diagram explaining an example of a name-candidate-list display.

FIG. 4 is a diagram explaining an example of the name-candidate-list display 110. The example in FIG. 4 corresponds to FIG. 2. As illustrated in FIG. 4, the name-candidate-list display 110 includes a field 111, in which device numbers are written, and a field 113, in which one or more name candidates are written for each entry, and lists name candidates in association with devices. As illustrated in FIG. 4, the name-candidate-list display 110 may include a field other than the field 111 and the field 113, such as a field 112, in which the data type is written.

Next, when the user inputs an instruction to select a character string from the name candidates displayed on the name-candidate-list display 110 or inputs a new character string that the user desires to register as a label name, the label registering unit 23 receives the input (Step S12). Then, the label registering unit 23 checks whether there is an error in the pair of the input character string and the device corresponding to the character string (Step S13). Specifically, in the process at Step S12, the label registering unit 23 receives the input character string as an input of a label name related to the device associated with the input character string in the name-candidate-list display 110. In the process at Step S13, the label registering unit 23 checks whether the label name that is the same as the input label name is not redundantly registered with a different device and also checks whether the label name does not include a forbidden character. If the same label name is redundantly registered with a different device or the label name to be registered includes a forbidden character, the result of the error check indicates an error. When there is an error (an error is present at Step S13), the label registering unit 23 causes the name-candidate-list generating unit 22 to perform the process at Step S11 again as an error process so as to prompt the user to select or newly input a label name to be registered. When the result of the error check indicates no error (an error is not present at Step S13), the label registering unit 23 records the correspondence between the label name to be registered and the device in the label name information 46 so as to register the label (Step S14).

The content of the error process is not limited to the above. The label registering unit 23 may display, as the error process, information indicating that the label name is redundantly registered.

Figure 5:
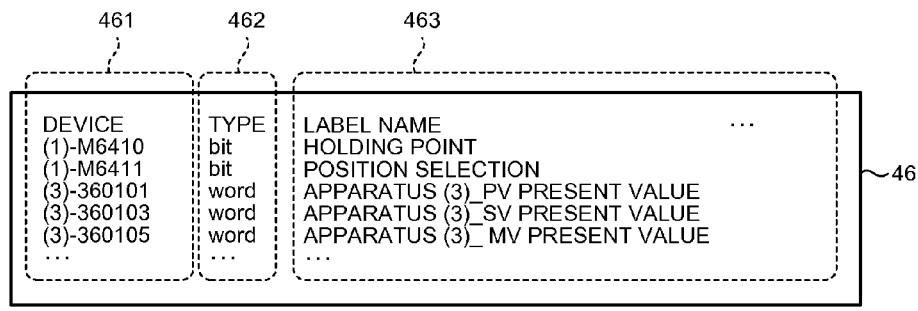
FIG. 5 is a diagram explaining an example of label name information.

FIG. 5 is a diagram explaining an example of the label name information 46. As illustrated in FIG. 5, the label name information 46 includes a field 461, in which device numbers are written, and a field 463, in which one label name is written for each entry. With such a display form, label names and devices are associated with each other on a one-to-one basis in the label name information 46. The label name information 46 may include a field other than the field 461 and the field 463, such as a field 462, in which the data type is written.

Subsequent to the process at Step S14, the label registering unit 23 determines whether the devices included in the projects 44 are replaced by the registered labels (Step S15). Whether to perform label replacement automatically after labels are registered may be preset and the label registering unit 23 may perform the determining process at Step S15 depending on the setting. Moreover, the label registering unit 23 may wait for an input instructing to perform label replacement and perform the determining process at Step S15 depending on the presence or absence of the input.

When the label registering unit 23 determines that label replacement is to be performed (Yes at Step S15), the label registering unit 23 replaces the descriptions of the device numbers included in all the projects 44 with the registered labels (Step S16). When the label registering unit 23 determines that label replacement is not to be performed (No at Step S15), the label registering unit 23 skips the process at Step S16.

Then, the label registering unit 23 displays the registration result (Step S17), and the operation of the system construction support apparatus 1 according to the embodiment of the present invention ends. The label registering unit 23 may display the label name information 46 as the registration result.

Figures 1, 6:
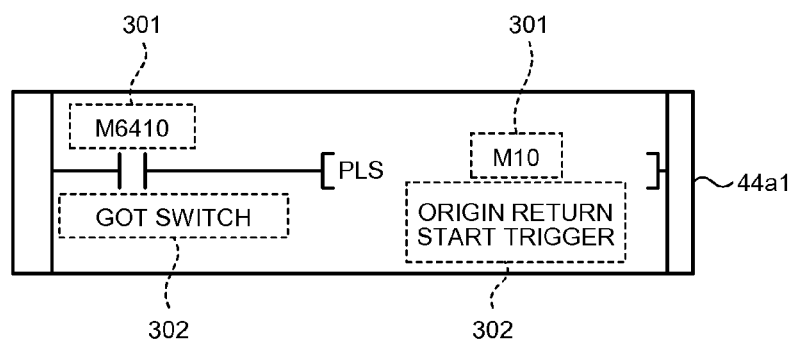
Figures 2, 6:
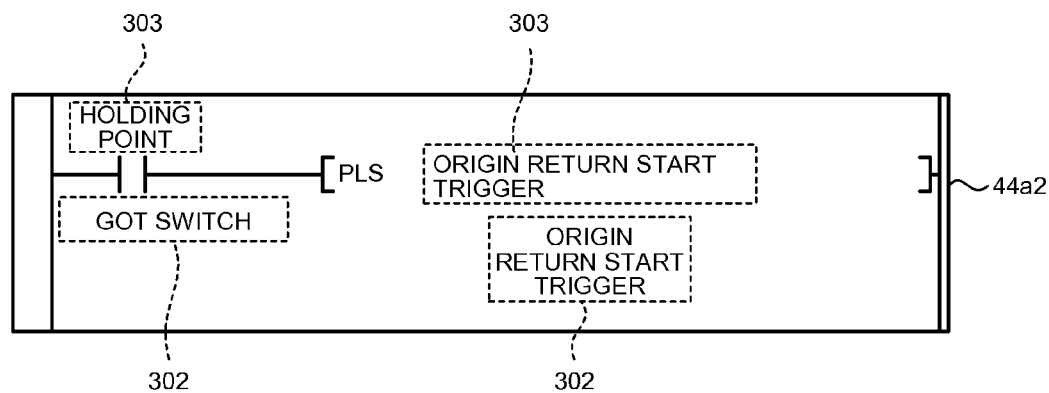

FIG. 6-1 is a diagram explaining an example of the control program written using device numbers. FIG. 6-2 is a diagram explaining an example of the control program after device numbers are converted into label names. As illustrated in FIG. 6-1, a control program 44a1 includes two device number descriptions 301 ("M6410" and "M10"). A comment 302 corresponding to the device number is written in the lower part of each of the device number descriptions 301. Specifically, the comment "GOT switch" is associated with the device number "M6410" and the comment "origin return start trigger" is associated with the device number "M10". The label registering unit 23 performs label replacement on the control program 44a1 so as to create a control program 44a2 illustrated in FIG. 6-2. In the control program 44a2, each of the device number descriptions 301 is replaced by a label description 303. Specifically, the device number "M6410" is replaced by the label "holding point" and the device number "M10" is replaced by the label "origin return start trigger".

FIG. 7-1 is a diagram explaining an example of a display screen of a programmable display, FIG. 7-2 is a diagram explaining an example of screen data written using device numbers, and FIG. 7-3 is a diagram explaining an example of screen data after device numbers are converted into label names. As illustrated in FIG. 7-1, eight switch objects are arranged on a display screen 500. A nameplate, such as "real mode main", "holding point", "position selection", or "indirection", is displayed on each object. Screen data 44b1 illustrated in FIG. 7-2 is screen data for displaying the display screen 500. The screen data 44b1 is written such that a device number description 311 is included for each switch. The label registering unit 23 performs label replacement on the screen data 44b1 so as to create screen data 44b2 illustrated in FIG. 7-3. In the screen data 44b2, the device number descriptions 311 are replaced by label descriptions 312.

As described above, according to the embodiment of the present invention, the system construction support apparatus 1 is configured to include the non-volatile memory 4 that stores in advance the apparatus information (the projects 44 and the design information 45) that is written such that device numbers and character strings associated with the device numbers are included; the name-candidate-list generating unit 22 that extracts character strings included in the apparatus information in association with device numbers that are associated with the character strings, organizes the extracted character strings into an entry for each device on the basis of a device number corresponding to each of the character strings, and displays a list of the character strings; and the label registering unit 23 that receives an input selecting one of the character strings displayed in the list for each entry and registers the selected character string as a label of a device corresponding to the character string. Therefore, labor of the user for searching for device numbers one by one from the projects 44 can be reduced. In other words, the operation of registering labels can be easily performed. Moreover, because all the device numbers are displayed in a list, the user can register a label unique to each device.

Moreover, the label registering unit 23 is configured to check whether the same label is registered with a plurality of different devices and, when the same label is registered with the different devices, perform an error process. Therefore, the user does not have to perform an operation of checking whether the same label is not registered with a plurality of different devices. In other words, the operation of registering labels can be easily performed.

Moreover, the name-candidate-list generating unit 22 is configured to determine whether two device numbers included in two pieces of the apparatus information on different devices, respectively, indicate the same device on the basis of the connection information 43 and, when the two device numbers indicate the same device, organizes character strings associated with the two device numbers, respectively, into one entry. Therefore, the same label can be consistently assigned to the same device that is used in projects of a plurality of apparatuses.

Moreover, the label registering unit 23 is configured to, after registering a label, replace a device number included in the apparatus information with a label that is registered and corresponds to a device that the device number refers to. Therefore, the user does not have to perform the operation of replacing the device numbers included in the projects 44 with labels.

INDUSTRIAL APPLICABILITY

As described above, the system construction support apparatus according to the present invention is preferably used for a system construction support apparatus that supports the construction of the system.

REFERENCE SIGNS LIST 1 system construction support apparatus, 2 computing device, 3 volatile memory, 4 non-volatile memory, 5 input device, 6 display device, 21 configuration diagram editing unit, 22 name-candidate-list generating unit, 23 label registering unit, 41 system construction support program, 42 configuration information, 43 connection information, 44, 44a, 44b project, 44a1, 44a2 control program, 44b1, 44b2 screen data, 45, 45a, 45b design information, 46 label name information, 100 system configuration diagram, 101 PLC, 102 display, 103 general-purpose apparatus, 104 connection line, 110 name-candidate-list display, 111, 112, 113, 461, 462, 463 field, 301, 303, 311, 312 description, 302 comment, 500 display screen.

The invention claimed is:

1. A system construction support apparatus that supports generation of a system configuration diagram that simulates a system configured from apparatuses, the system construction support apparatus comprising:
a memory that stores apparatus information that is set in an apparatus or is associated with the apparatus and comprises character strings associated with device numbers;
a processor that extracts the character strings included in the apparatus information and that are associated with the device numbers, organizes the extracted character strings into an entry for each device based on a respective device number from among the device numbers corresponding to each of the character strings, and generates a list of character strings;

a display that displays the generated list of the character strings; and an input interface that receives an input selecting one of the character strings displayed in the list for each entry, wherein the processor, in response to the input received via the input interface, registers the selected character string as a label of the device corresponding to the character string.

2. The system construction support apparatus according to claim 1, wherein the processor further checks whether the same label is registered with a plurality of different devices and, in response to the check performed by the processor indicating that the same label is registered with the different devices, the processor performs an error process.

3. The system construction support apparatus according to claim 1, wherein:

the system includes a plurality of apparatuses, the memory stores connection information describing a connection relationship between the apparatuses, and the processor determines whether a first device number included in the apparatus information with respect to a first apparatus and a second device number included in the apparatus information with respect to a second apparatus indicate the same device based on the connection information, and in response to the processor determining that the first and second device numbers indicate the same device, organizes character strings associated with the first and second device numbers, respectively, into one entry.

4. The system construction support apparatus according to claim 1, wherein after registering the label, the processor replaces the device number included in the apparatus information with the registered label that corresponds to a device that the device number refers to.

5. The system construction support apparatus according to claim 1, wherein:

the devices numbers identify devices in the system configuration diagram of the system, the devices comprise at least two devices which are a programmable logic controller and a display, the configuration diagram comprises a first representation of the devices and a second representation of connection relationships between the devices, and the apparatus information is loaded to each of the devices together with a respective control program individually designed for the respective device from among the devices.

* * * * *